UNITED STATES PATENT OFFICE.

CHARLES N. FORREST, OF RAHWAY, NEW JERSEY, ASSIGNOR TO THE BARBER ASPHALT PAVING COMPANY, OF PHILADELPHIA, PENNSYLVANIA, A CORPORATION OF WEST VIRGINIA.

MANUFACTURE OF ASPHALT CEMENT FROM NATURAL ASPHALTS.

1,163,593.      Specification of Letters Patent.      Patented Dec. 7, 1915.

No Drawing. Application filed August 20, 1912, Serial No. 715,973. Renewed February 26, 1915, Serial No. 10,867.

*To all whom it may concern:*

Be it known that I, CHARLES N. FORREST, of the city of Rahway, in the county of Union and State of New Jersey, have invented certain new and useful Improvements in the Manufacture of Asphalt Cement from Natural Asphalts, of which the following is a description.

In the asphalt industry, particularly the asphalt paving industry, it has heretofore been customary to prepare what is known as asphalt cement by combining a hard asphalt with a fluid fluxing agent, such as petroleum residuum or other oils, in order to produce a relatively soft substance, and this has been done without regard to any particular chemical characteristics of the original substances so combined but merely to change the physical characteristic of consistency by making a mechanical mixture. The characteristic of consistency of asphalt, while a most important one, is not the sole criterion of the same for any specific purpose. The further physical characteristics of cohesiveness and adhesiveness are also capable of regulation and are of the utmost importance in the paving industry, particularly since the cement employed to produce a paving mixture, which also consists of mineral particles such as sand or broken stone of various sizes, must be sufficiently adhesive to perform the function of a cement, rather than to lubricate as if a grease were used, and must be sufficiently cohesive to impart toughness, strength and elasticity to the pavement.

I have discovered that the natural asphalts which closely approximate the even balance of cohesiveness and adhesiveness, which is so essential in a bituminous cement intended for paving purposes, are those which contain a relatively high amount of sulfur derivatives of the hydrocarbons which constitute the mineral bitumen or active component of the asphalt. For instance, natural Trinidad Lake asphalt the bitumen of which contains about 6% sulfur, Bermudez Lake asphalt the bitumen of which contains about 5% sulfur, Maracaibo asphalt the bitumen of which contains approximately 5.5% sulfur, and Cuban asphalt the bitumen of which contains approximately 7% sulfur. All such crude asphalts occur in nature in solid form combined with more or less water and mineral impurities; and before they are employed in the arts they are submitted to a refining process which consists of heating the same to a temperature between 300° and 400° F., until the water and other volatile constituents are expelled. The refined asphalt thus produced is then a relatively hard material, as tested for penetration, and to further prepare it for use as an asphalt cement, it is thereafter combined with an oily fluxing agent, either immediately after refining and in the same receptacle in which it has been refined, or subsequently at some other point after it has cooled and been transported in hard form to such point.

I have further discovered that the process of refining crude asphalt which I have just described and which has heretofore been universally employed, in addition to dehydrating the asphalt, has effected a liberation of that portion of its natural sulfur which was held but feebly in combination with the crude asphalt; which loss of sulfur I have found to be detrimental to the physical properties of asphalt cement. This sulfur escapes in the form of a gas as hydrogen sulfid. It is readily detected as it rides from the molten asphalt both by its characteristic odor and by testing with acetate of lead test paper.

According to my invention I prevent this loss of sulfur and cause it to become fixed during the refining operation, and thus produce an asphalt cement which is more cohesive, that is to say tougher and more elastic, than the cement which has heretofore been produced by the method above described. I find that certain types of fixed oils, for example linseed oil, soy bean, tung or Chinese wood oil, fish oil, or petroleum, if added and combined with the crude asphalt simultaneously together, have the capacity of absorbing the sulfur which would otherwise be eliminated as gas during the refining process, and by such addition, the sulfur may be fixed and retained in the resulting asphalt cement very much to its advantage.

To practise my invention for the preparation of a paving cement of normal consistency, I add to 100 parts of crude sulfur-bearing natural asphalt about 15 to 20 parts of a suitable sulfur absorbing agent, as for instance, linseed oil, fish oil or petroleum, and subject the combination to the usual refining operation for the purpose of expelling water and other volatile constituents. It is desirable that the sulfur absorbing agent may be in the form of an oil as it may then further play its part as a fluxing agent, but there may be added to the refined asphalt thus secured a sufficient amount of a proper flux for the formation of cement as heretofore practised.

The amount and kind of the sulfur absorbing oil thus added to the crude asphalt may vary in order to:—(1) provide in an additional quantity what the particular flux may lack in sulfur absorbing capacity so as to assure an adequate amount of the sulfur absorbent element, and (2) to produce any range of consistencies demanded in the asphalt cement. For the former object such an amount of flux oil is added as will hold back the sulfur and not react with the acetate of lead test papers or meet such other chemical tests as will show that hydrogen sulfid is not being evolved.

Having thus described my invention, I claim:

1. The process of refining crude sulfur-bearing asphalt, which consists in heating it with evolution of steam in the presence of a sulfur absorbing agent, whereby the loss of sulfur is prevented.

2. The process of refining crude sulfur-bearing asphalt which consists in heating in the presence of a sulfur absorbing oil, whereby the loss of sulfur is prevented.

3. The process of making asphalt cement for paving purposes which consists in refining crude sulfur-bearing asphalt in the presence of a sulfur absorbing oil, whereby the proper balance of cohesion and adhesion is retained in the asphalt, sufficient oil being added to obtain the required consistency.

4. Refined asphalt with its normal sulfur content retained by the addition of a sulfur absorbing medium.

In testimony whereof, I have hereunto signed my name, at Rahway, New Jersey, this 17th day of August, 1912.

CHARLES N. FORREST.

Witnesses:
 RAYMOND M. LAING,
 M. A. BRANE.